No. 649,207. Patented May 8, 1900.
E. J. HOWARD.
COFFEE OR TEA INFUSER.
(Application filed Dec. 16, 1898.)
(No Model.)
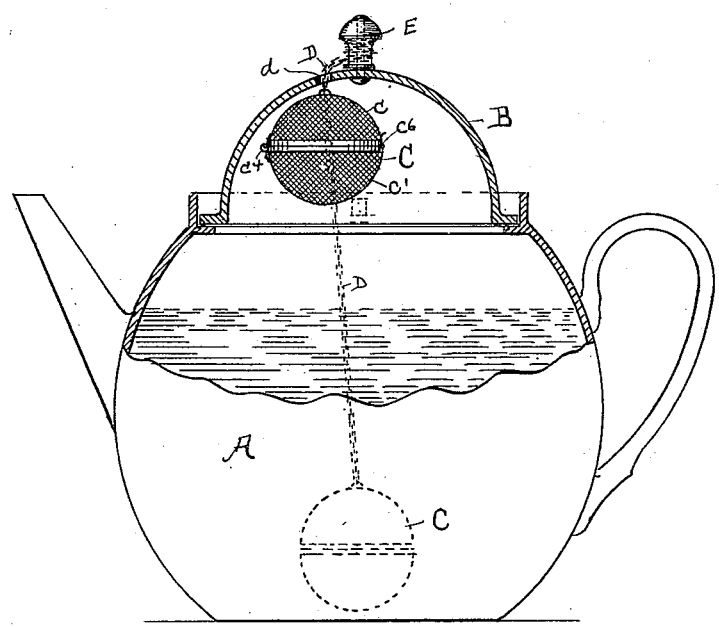
WITNESSES
INVENTOR
Edward J. Howard

United States Patent Office.

EDWARD J. HOWARD, OF NEW YORK, N. Y., ASSIGNOR, BY MESNE ASSIGNMENTS, TO ANNIE CAMPBELL, OF WASHINGTON, DISTRICT OF COLUMBIA.

COFFEE OR TEA INFUSER.

SPECIFICATION forming part of Letters Patent No. 649,207, dated May 8, 1900.

Application filed December 16, 1898. Serial No. 699,518. (No model.)

*To all whom it may concern:*

Be it known that I, EDWARD J. HOWARD, a citizen of the United States, and a resident of New York, in the county of New York and State of New York, have invented a certain new and useful Coffee or Tea Infuser, of which the following is a specification.

My invention refers to tea and coffee pots; and the object is to provide the same with an infuser in the form of a strainer and means for raising and lowering the same.

It consists of a revolving knob, a chain, and an infuser.

The drawing represents an elevation of a teapot with cover, the pot partly in section and the cover entirely in section, illustrating my improvement.

The teapot A is of ordinary or improved construction and can be made out of earthenware or metal. The cover B can be made in any shape and of earthenware or metal and is secured onto the teapot in the usual or improved manner.

C is the infuser, consisting of two halves $c$ $c'$, hinged at $c^4$ and latched at $c^6$. It is made of metal (perforated) or wire-gauze. It can be made of glass, china, or earthenware, also perforated and provided with a suitable cover. This infuser is placed in the teapot, as shown in the figure, and is attached to the chain D, which passes through a hole $d$ in the cover. It is then connected to the knob E, revolving on a pin secured to the cover. The infuser is first filled with dry tea and then lowered to the bottom of the teapot or coffee-pot, as the case may be. (See dotted lines of the figure.) Hot water is then poured into the teapot. When the infusion is of any strength desired and it is required to raise the infuser or strainer out of the infusion, the person attending the teapot simply turns the knob, thereby winding the chain around same and easily and readily drawing the infuser up into the cavity of the cover. (See full lines of the figure.) The object of raising the infuser out of the infusion is to permit the liquid to be kept at boiling heat any length of time without increasing its strength. The heated chain being wound around the knob is thus kept away from the attendant's hands. By raising the infuser in the above manner I am enabled to vary its height and regulate the strength of the infusion. One or more chains can be used, and they are attached to the infuser by a hook or hooks to enable the infuser to be readily detached for emptying or refilling.

What I claim is—

In a coffee and tea infuser raiser, and in combination with the cover of the coffee and tea vessel, the knob E, revolving on a pin secured to the said cover, and a chain, attached to said knob and passing through a hole in said cover, and an infuser, secured to the free end of said chain, all arranged to effect the result set forth, and described.

Signed at New York, in the county of New York and State of New York, this 14th day of April, A. D. 1898.

EDWARD J. HOWARD.

Witnesses:
E. F. BARRITT,
EDWARD COLLINS.